United States Patent [19]
Scragg et al.

[11] Patent Number: 4,799,504
[45] Date of Patent: Jan. 24, 1989

[54] TANK CONSTRUCTIONS FOR CONTAINING FUEL, AND WATER SEPARATORS FOR FUEL FEED SYSTEMS

[76] Inventors: Edgar P. Scragg; John E. Scragg, both of 60 Mulder St., Florida Park Extension 3, Florida, Transvaal Province, South Africa

[21] Appl. No.: 2,282

[22] Filed: Jan. 12, 1987

[30] Foreign Application Priority Data

Jan. 17, 1986 [ZA] South Africa ............... 86/0378
Aug. 5, 1986 [ZA] South Africa ............... 86/5881

[51] Int. Cl.$^4$ ........................................... F16K 31/24
[52] U.S. Cl. ...................................... 137/38; 137/172; 137/192; 137/399
[58] Field of Search ............... 137/172, 192, 399, 38, 137/43, 544, 549

[56] References Cited

U.S. PATENT DOCUMENTS

| | | | |
|---|---|---|---|
| 2,253,509 | 8/1941 | Dort . | |
| 2,439,864 | 4/1948 | Ritchie | 137/434 |
| 2,625,268 | 1/1953 | Hatfield . | |
| 2,845,947 | 8/1958 | Griswold | 137/172 X |
| 3,079,943 | 3/1963 | Oleskow | 137/429 X |
| 3,147,771 | 9/1964 | Elbogen | 137/172 X |
| 3,182,800 | 5/1965 | Kasten | 137/172 X |
| 4,519,349 | 5/1985 | Cheney . | |

FOREIGN PATENT DOCUMENTS

| | | |
|---|---|---|
| 131835 | 1/1985 | European Pat. Off. . |
| 207840 | 1/1987 | European Pat. Off. . |
| 3217162 | 5/1982 | Fed. Rep. of Germany . |
| 885902 | 1/1962 | United Kingdom . |
| 2129329 | 5/1984 | United Kingdom . |

Primary Examiner—Alan Cohan
Attorney, Agent, or Firm—Abelman Frayne Rezac & Schwab

[57] ABSTRACT

A fuel tank construction comprising a tank and a sump is disclosed which construction includes a float operated water separator. The separator operates automatically to drain water which has separated out and accumulated at the bottom of the sump. The separator is in the sump which is secured to the underside of the tank. The tank has an opening through which the sump and tank communicate, and there is a normally open one-way valve in this opening. This valve prevents water and solids flowing back into the tank from the sump if the tank construction is inverted. Within the tank there is a filter through which fuel flows to reach the fuel outlet line. The filter is normally spaced along the tank from said opening but can be displaced to a position overlying the opening when access to it through said opening is required for servicing purposes.

7 Claims, 5 Drawing Sheets

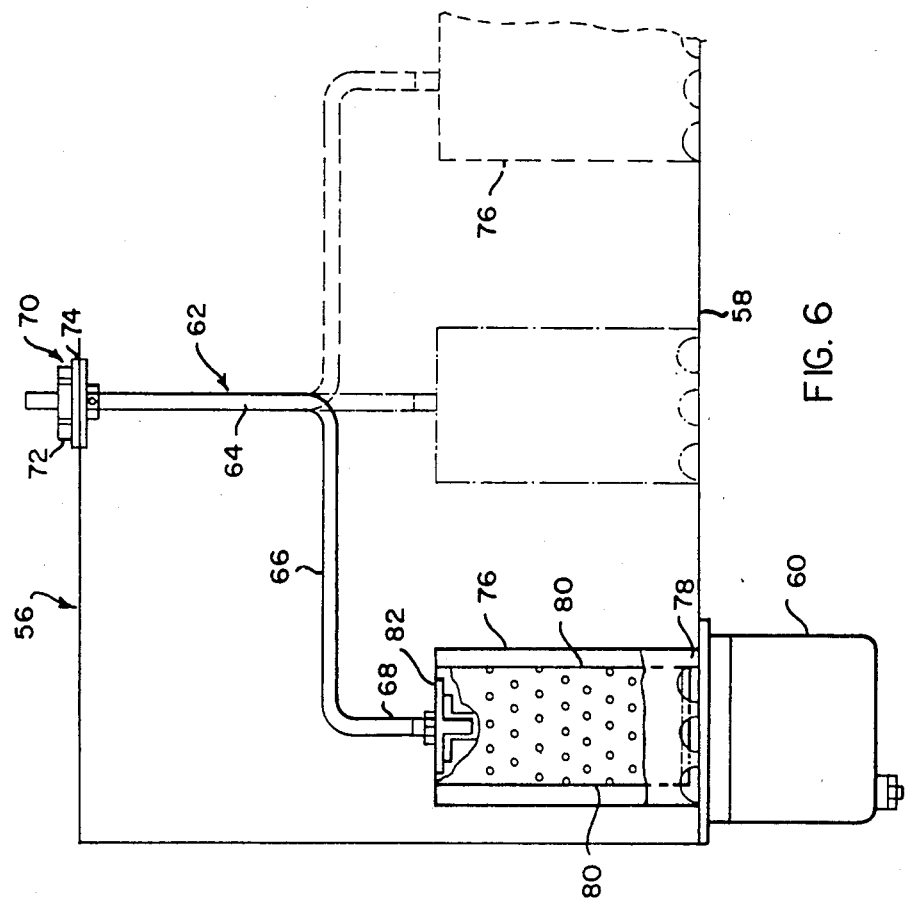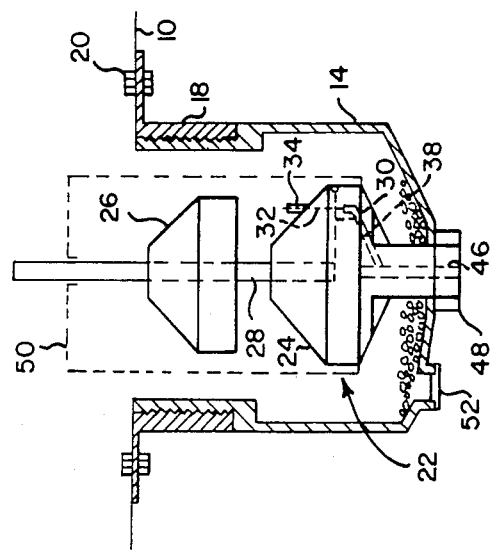

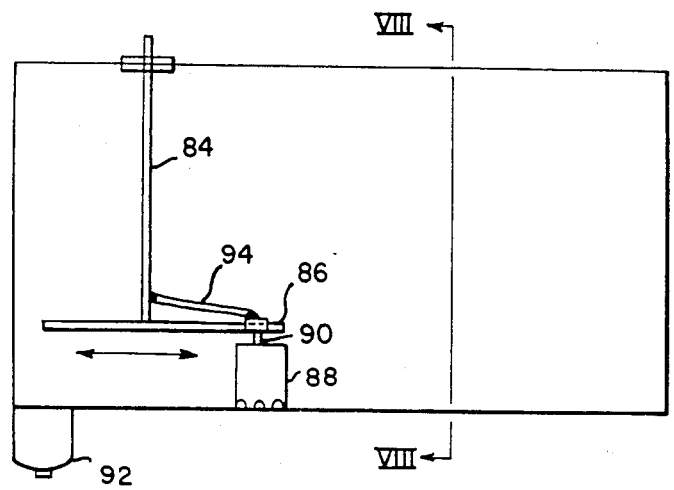
FIG. 7
FIG. 8
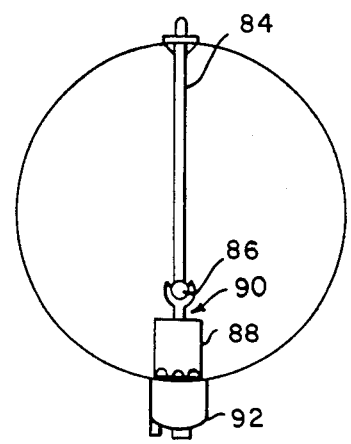
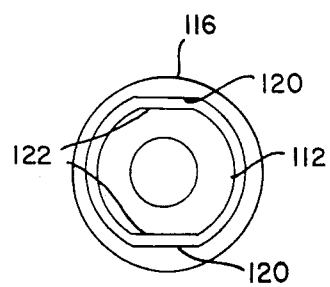
FIG. 12
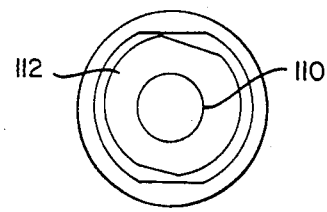
FIG. 13

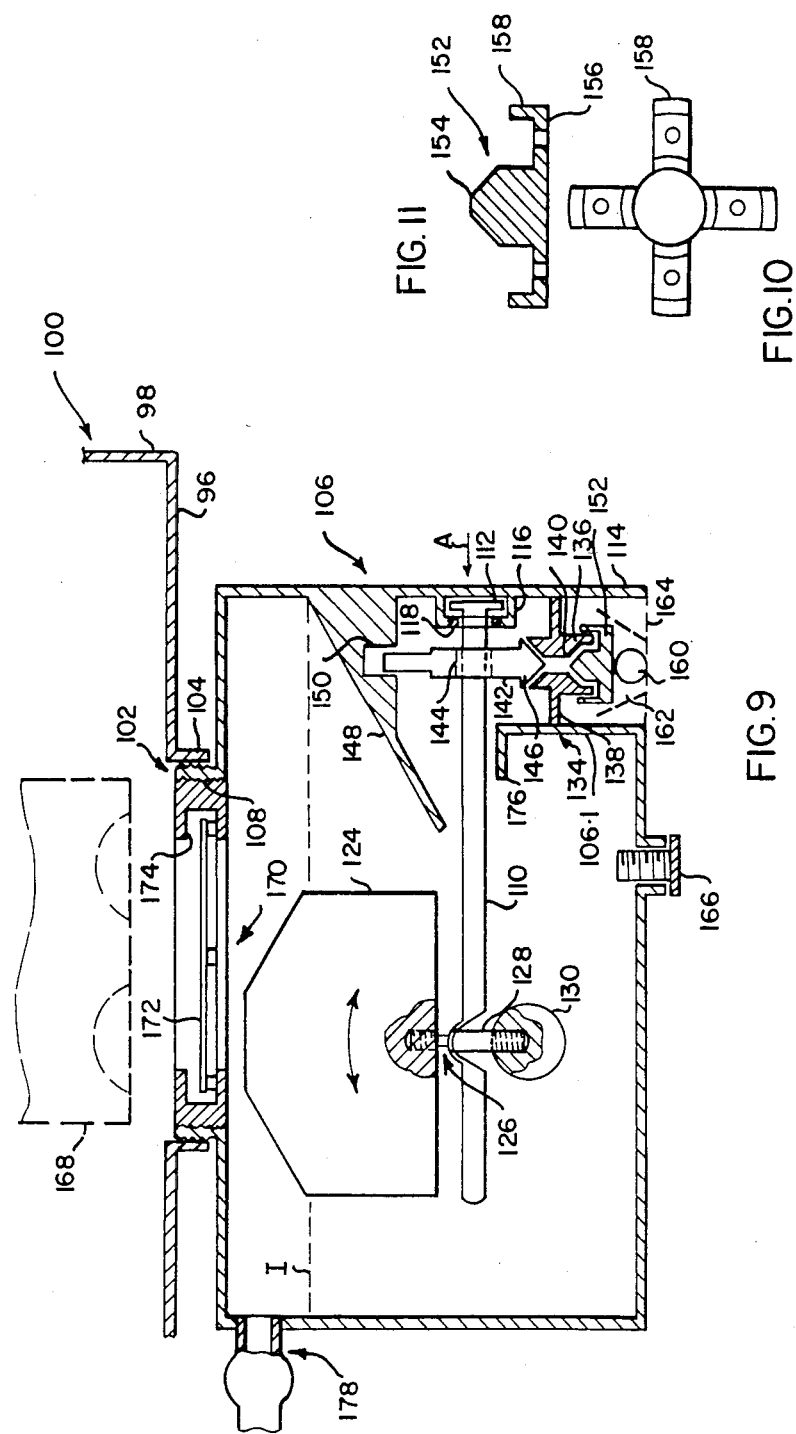

TANK CONSTRUCTIONS FOR CONTAINING FUEL, AND WATER SEPARATORS FOR FUEL FEED SYSTEMS

This invention relates to tank constructions for containing fuel and to water separators for fuel feed systems.

The problems encountered with fuel tank constructions and their fuel feed systems are well known and have received the attention of many inventors over the years. Water in the fuel, solid matter in the fuel and sludge formation in a fuel storage tank can all result in foreign materials being fed from the fuel tank to the injectors or carburettors of an engine with the consequent risk of damage. Many types of filter for removing solid matter and many types of water-from-fuel separators have been proposed for incorporation into the fuel flow line leading from the tank.

The main object of the present invention is to provide improved means for removing solid matter and water from fuel before it reaches the carburettors or fuel injectors of an engine.

Another object of the present invention is to minimise sludge formation in the tank and to confine whatever formation there is to those parts of the tank from which the sludge is unlikely to reach the fuel feed line.

A further object of the invention is to provide means for automatically eliminating water from a fuel tank.

Yet another object of the invention is to provide a tank construction which includes a filter in the fuel tank, and which structure facilitates routine servicing of the filter.

According to one aspect of the present invention there is provided a fuel tank construction which includes a tank and a sump, there being an opening in a bottom wall of the tank and the sump being secured to the tank and lying beneath said bottom wall, an outlet from said sump, a float in said sump, the float having a specific gravity such that it sinks in fuel but floats on any water which has accumulated in the sump, a valve which normally closes-off said outlet, and valve operating means which opens said valve upon the float rising with an increasing level of accumulated water in the sump.

There can be a normally open gravity operated valve in said opening for permitting liquid flow downwardly into said sump from the tank but preventing liquid flow from said sump to the tank while the tank construction is inverted.

To minimise the risk of fuel leakage in the event of an accident, the tank construction can also include a further normally open valve for controlling liquid flow through said outlet, said further valve including a downwardly facing valve seat, and a valve closure member having a seating surface which is normally held spaced downwardly from said valve seat by gravity.

A fuel filter can be provided within the tank, the means mounting the fuel filter being such that it is capable of movement between a first position in which it is above said opening and a second position in which it is spaced laterally from said opening, there being a fuel outlet line which communicates with the fuel storage space of the tank through said filter.

According to another aspect of the present invention there is provided a fuel tank construction including a tank having an access opening in the bottom wall thereof, a fuel filter within the tank, means mounting the fuel filter for movement between a first position in which it is above said opening and a second position in which it is spaced laterally from said opening, and a fuel outlet line which communicates with the fuel storage space of the tank through said filter.

In one embodiment said fuel filter is mounted on a support which includes a first vertical portion rotatably mounted on the top wall of the tank, a radius arm extending from said first portion, and a second vertical portion extending downwardly from the outer end of said radius arm, said filter being mounted on said second vertical portion. In another embodiment there is a bar which extends along the tank from a position adjacent said opening to a position remote from said opening, and means mounting said filter on said bar for movement along said bar.

According to a further aspect of the present invention there is provided a fuel tank construction comprising a tank and a sump secured to the underside of the tank, an outlet from the sump, a float in the sump the specific gravity of which is such that it sinks in fuel but floats on any water which has accumulated in the sump, a first normally closed valve which controls flow through said outlet and which opens upon the float detecting an increasing water level in the sump, and a second valve for controlling flow through said outlet which second valve is normally open and which is gravitationally biassed to its open position but which moves under gravitational forces to a closed position upon the tank construction being tilted sufficiently or inverted.

According to a still further aspect of the present invention there is provided a water from fuel separator comprising a housing having a fuel inlet and a fuel outlet, a float in the housing the specific gravity of which is such that it floats on any water in the housing but sinks in fuel, a water outlet from the housing, a valve which normally closes-off said water outlet, a linkage between a closure member of the valve and the float whereby the float opens the valve when it rises upon water accumulating in the housing, the float being connected to the linkage by a universal joint which enables the float to remain vertical when the housing is tilted.

According to yet another aspect of the present invention there is provided a fuel tank construction including a tank having a top wall, an opening in the top wall, a mounting structure for a fuel filter, the mounting structure passing through said opening and including, on that part thereof which is within the tank, mounting means for the filter, said mounting structure normally closing-off said opening, and the size of said mounting means and a filter carried thereby being smaller than said opening whereby a filter and the mounting means therefor can be removed from the tank through said opening.

For a better understanding of the present invention, and to show how the same may be carried into effect, reference will now be made, by way of example, to the accompanying diagrammatic drawings in which:

FIG. 3 illustrates, to a larger scale, a sump and water separator of the fuel tank construction of FIGS. 1 and 2;

FIG. 6 is a diagrammatic illustration of a fuel tank construction having a fuel filtering system therein;

FIG. 7 is a side elevation of a further fuel tank construction having a fuel filtering system therein;

FIG. 8 is a section on the line VIII—VIII in FIG. 7;

FIG. 9 is a diagrammatic vertical section illustrating a fuel tank construction including an automatic water separator;

FIG. 10 is a plan view, to a larger scale, of one of the components of the separator of FIG. 9;

FIG. 11 is a vertical section through the component of FIG. 10;

FIGS. 12 and 13 are fragmentary views taken in the direction of arrow A in FIG. 9.

Figure 1:
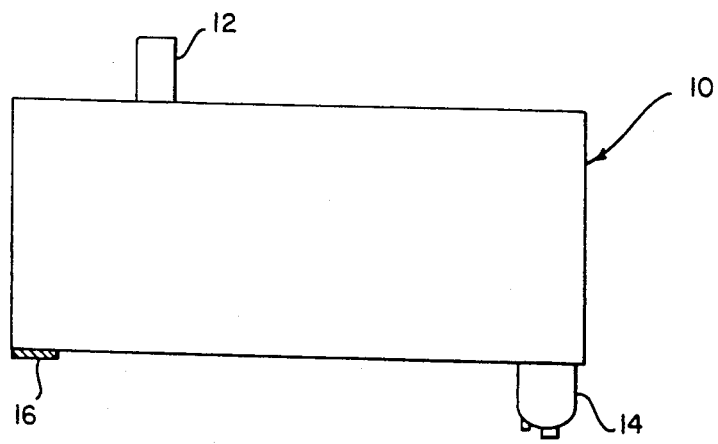
FIG. 1 is a side elevation of a fuel tank construction.
Figure 2:
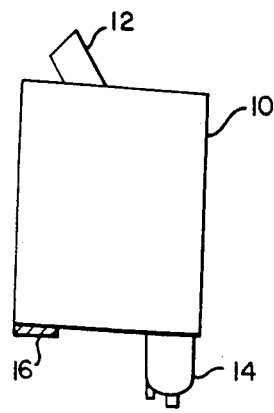
FIG. 2 is an end elevation of the fuel tank construction of FIG. 1.

Referring now to FIG. 1, reference numeral 10 designates a fuel tank which has a filler inlet at 12. The construction illustrated further includes a sump 14 which is below the tank 10 and at one corner thereof. The tank 10 is packed-up at 16 so as to cause it to slope downwardly in the direction of the sump 14. Any dirt or water which enters the tank tends to gravitate into the sump 14.

Figure 4:
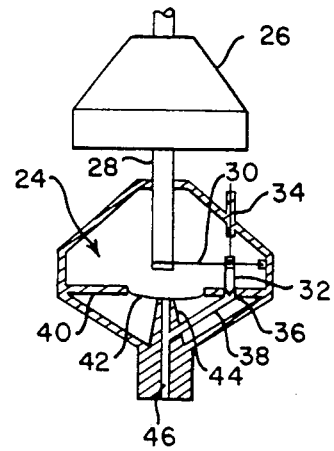
FIG. 4 illustrates in more detail the separator shown in FIG. 3.

Turning now to FIGS. 3 and 4, the tank 10 is shown as having an internally threaded collar 18 secured to the underside thereof by means of a ring of bolts 20. The sump 14 is externally threaded and screws into the collar 18. The sealing means provided for preventing leakage have not been illustrated.

Within the sump 14 there is a water separator 22 which comprises a chamber 24 above which there is a float 26. A rod 28 extends downwardly from the float 26 and is connected to a horizontally extending lever 30 (see particularly FIG. 4). The lever 30 is pivotally mounted on the wall of the chamber 24. A valve closure member 32 has a stem thereof in a valve guide 34 forming part of the wall of the chamber 24. The annular gap between the stem and the guide 34 also forms a restricted inlet to the chamber 24. The lower end of the valve closure member 32 co-operates with a seat 36 controlling access to a passage 38. The seat 36 forms part of a horizontal partition wall 40 which has a central opening therein. This central opening is closed-off by a diaphragm 42.

A spigot 44 lies below the wall 40; the lower face of the diaphragm 42 normally pressing on the top of the spigot 44. There is a passage 46 in the spigot 44, the passage 38 leading into the passage 46, and the two passages then extending downwardly to the open blower end thereof. A nut 48 secures the chamber 24 to the sump 14. The underside of the diaphragm 42 is exposed to the contents of the tank 10 and sump 14.

A screen 50 encloses the float 26 and the upper part of the chamber 24 to inhibit ingress of dirt into the chamber 24.

In the bottom of the sump 14 there is a drain plug 52. The drain plug 52 can be of special external configuration. For example, it can be configured such that only a spanner of special form (such as is shown at 54 in FIG. 5) can be connected thereto.

The specific gravity of the material of the float 26 is such that it will float on water but will sink in diesel fuel or petrol. As water collects in the sump 14, the float rises until eventually the lever 30 lifts the valve closure member 32 clear of the seat 36. Water can then flow, at a relatively slow rate, out of the sump 14 through the passage 38 and the lower part of the passage 46.

Should the valve 32 open fully and sufficient water flow out to lower the pressure in the chamber 24 significantly, then fluid pressure below the diaphragm 42 lifts it away from the spigot 44 so that water can now flow out through the larger passage 46.

As the water level drops, the float 26 descends and eventually the valve closure member 32 re-engages the seat 36 to close-off the passage 38. The chamber 24 then refills slowly through its restricted inlet and the diaphragm 42 is urged back onto the seat which encircles the mouth of the passage 46.

If only small amounts of water collect then these will normally flow out via the passage 38 without the diaphragm 42 lifting. However, a sudden accumulation of a larger amount of water, such as can occur when fuel is being pumped into the tank 10, will result in the main outlet passage 46 being opened.

Figure 5:
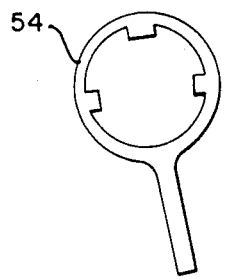
FIG. 5 illustrates a spanner for removing a plug.

In the event that dirt particles collect in the sump 14, the plug 52 can be removed, using the spanner 54 shown in FIG. 5, and the particles allowed to drain out with whatever water is in the sump 14.

Referring now to FIG. 6, reference numeral 56 designates a fuel tank. The fuel tank will normally be one which contains diesel but could contain petrol (gasolene) or paraffin. The tank 56 has an opening (not shown) in the bottom wall 58 thereof and a sump 60 is removably mounted in the opening 58 e.g. in the same way that the sump 14 is secured to the tank 10. Within the sump 60 there is a water separator which can be of the type described above and which is designated 22 in FIG. 3.

A support 62 is mounted in the tank 56. The support 62 is cranked so that it has a main vertical portion 64, a radius arm 66 and a short vertical portion 68. The support 62 is constituted by a length of tubing which also forms a fuel line. The upper end of the main vertical portion 64 passes through the top of the tank, and is secured to the top of the tank by a connector 70. The connector 70 can take any suitable form.. As illustrated, there is a flange within the tank 56, the flange having a spigot portion (not shown) which protrudes through the top of the tank. Screwed onto the spigot portion is a lock nut 72, there being a sealing ring 74 between the lock nut 72 and the top of the tank.

When the lock nut 72 is loosened, the entire support 62 can be turned about the axis of the main vertical portion 64. In this regard, in FIG. 6, the support is shown in the position it occupies for servicing purposes. The dotted outline indicates the normal operating position of the support.

At the lower end of the short vertical portion 68 there is a shroud 76. The shroud 76 is in the form of a cylinder which is closed at the upper end thereof and open at the lower end. The shroud terminates very close to or actually contacts the bottom 58 of the tank 56 and its lower edge is formed with a series of cut-outs 78 of semi-circular shape. Within the shroud 78 there is a filter 80. The filter 80 is secured in any suitable manner e.g. by means of a bayonet connection or screw threading to the top wall 82 of the shroud 76. The interior of the filter 80 communicates with the interior of the tubing that constitutes the support 62.

In use of the fuel tank construction of FIG. 6, the fuel pump (not shown) of the engine (not shown) draws fuel through the tubing constituting the support 62. before reaching the inlet end of this tubing, the fuel flows into the shroud 76 through the cut-outs 78 and through the filter 80 which removes solid particles and is also water repellent.

Because of solid particles which get into the tank 56, particularly where off-road and earth moving vehicles are concerned or where there is a dusty atmosphere, and because of the formation of sludge, the filter 80 can get blocked to the extent that free flow of fuel to the engine is inhibited. Once this occurs, the sump 60 is detached from the bottom of the tank 56 and the tank allowed to drain. The lock nut 72 is then loosened so that the support 62 can be rotated about the vertical axis of the main vertical portion 64. Because the shroud 76 is at the outer end of the radius arm 66, it moves in a circle as the vertical support 62 is rotated. This brings it to a position immediately over the opening in the bottom wall 58 of the tank 56. The size of this opening is such that the mechanic can put his hand into the tank, grasp the filter, and release it from its mounting structure. The filter can be replaced and simultaneously the inside of the tank 56 flushed through its bottom opening. The tank is readied for re-use by rotating the support 62 so that the shroud 76 and new filter 80 move away from the opening in the bottom of the tank, and the sump 60 is then re-attached. Because the sump is at the lowest point in the tank where water and solid particles accumulate, it is necessary for the normal "in use" position of the filter to lie remote from the sump.

Turning now to FIGS. 7 and 8, these show a tank of cylindrical form. The swinging support 62 of FIG. 6 cannot be used with such a tank because the bottom of the tank is not flat. In the constructional form of FIGS. 7 and 8 a vertical support 84 is fixed to the top of the tank in a non-rotatable manner. At the lower end of the support 84 there is a horizontal bar 86. The bar 86 extends axially of the tank and in its medial plane. A shroud 88 is attached, by means of a suitable structure 90, to the slide bar 86. The structure 90 is such as to enable the shroud 88 to be slid, as shown by the double headed arrow, from a position in which it is immediately above a sump 92 (which contains a water separator) to a position (that shown in FIG. 7) in which it is spaced from the opening in which the sump 92 is mounted. The mechanic merely reaches in, grasps the shroud 88 and pulls it towards the opening over which the sump 92 is mounted. Preferably the end of the tank remote from the sump 92 is packed-up slightly so that water and dirt gravitate towards the sump.

Because the shroud 88 moves relatively to the support 84, it is necessary to use, as part of the fuel line, a flexible pipe 94 (only shown in FIG. 7) which extends from the top of the shroud 8 to the vertical support 84 which can itself be in the form of hollow tubing.

Turning now to the fuel tank construction of FIGS. 9 to 13, only part of the bottom wall 96 and part of the side wall 98 of a fuel tank generally indicated 100 have been shown in this Figure. The bottom wall has therein an opening designated 102 which is encircled by an internally threaded flange 104. A sump 106 is secured to the underside of the tank 100 by means of an externally threaded spigot 108 thereof which is screwed into the flange 104. Suitable sealing means (such as 0-rings) are provided for preventing leakage between the flange 104 and the spigot 108.

A rod 110 having a disc-like end 112 is mounted on the side wall 114 of the sump 106 so as to be both rotable about its longitudinal axis and free to pivot vertically. The mounting of the rod 110 comprises a short sleeve 116 that protrudes inwardly from the wall 114. A disc 118 which has a central opening larger than the diameter of the rod 110 is screwed into the sleeve 116 and traps the end 112 in the sub-chamber bounded by the wall 114, the sleeve 116 and the disc 118. Internally, the sleeve 116 is not entirely cylindrical but has upper and lower flats 120 (FIGS. 12 and 13). The disc-like end 112 of the rod 110 is also formed with two flats 122 and is generally of smaller diameter than the sleeve 116.

A float 124 is mounted, by means of the structure designated 126, on the rod 110 adjacent the free end thereof. The structure 126 comprises a spindle 128 which is threaded at its upper and lower ends. The float 124 is screwed onto the upper end of the spindle 128 and a weight 130 is screwed onto the lower end of the spindle 128. The spindle 128 is stepped to provide a larger diameter lower part and a smaller diameter upper part. The opening in the rod 110 through which the spindle 128 passes is substantially oversized with respect to the smaller diameter upper part of the spindle 128. The shoulder between the two spindle parts is part-spherical in form and bears on the underside of the arch in the rod 110 thereby forming a universal joint. Thus the entire structure 126 can pivot, as shown by the double headed arrow in FIG. 9, in all directions with respect to the rod 110.

A valve designated 134 comprises a body 136 which is at the centre of a horizontal partition 138. The body 136 has a vertical passage 140 therethrough, the upper and lower ends of the passage 140 being tapered.

A valve closure member 142 is provided above the body 136, the valve closure element 142 having a transverse bore 144 therein through which the rod 110 passes with some clearance. The lower end of the element 142 is in the form of a cone 146 which, when the valve 134 is closed, seats in the tapering upper end of the passage 140. A sloping baffle 148 extends inwardly from the wall 114 and overlies the valve 134. This baffle serves to prevent solid particles falling into the valve 134. The underside of the baffle 148 has a blind bore 150 therein and the upper end of the member 142 is in this blind bore. The blind bore 150 thus serves a guide for the member 142.

A second valve closure member 152 (see also FIGS. 10 and 11) is provided below the body 136. The member 152 comprises a central cone 154 which co-operates with the tapering lower end of the passage 140. Four radially extending arms 156 extend outwardly from the cone 154 and guide flanges 158 protrude upwardly from the outer ends of the arms 156. The flanges 158 at all times lie outwardly of the body 136.

A mass 160 which is preferably in the form of a ball is contained within a mesh cone 162, the cone 162 forming part of a transverse mesh wall 164 which closes-off the lower end of the sub-housing 106.1 in which the valve 134 is contained. The configuration of the mesh cone 162 is such that even when the valve closure member 152 has dropped down to the lowermost position illustrated, the flanges 158 are still guided by the body 136.

A screwed-in drain plug is shown at 166.

Reference numeral 168 designates a shroud which is equivalent to the shroud 76 in FIG. 6. It will be understood that by removing the sump 106 and swinging the shroud 168 to the position illustrated, access can be had to the filter which is within the shroud 168. It will further be understood that, for normal operation, the shroud 168 will have been displaced laterally from the position illustrated.

A one-way valve, generally designated 170 in FIG. 9, is provided in the spigot 108. The valve 170 comprises a loose disc 172 and a seat 174. This valve, while the tank 100 is orientated as shown, is open and closes when the tank is inverted.

A flange 176 extends around the upper end of the sub-housing 106.1. This flange prevents solid particles falling into the sub-housing 106.1 from the bottom of the sump 106 when the tank is inverted.

In use of the fuel tank construction of FIGS. 9 to 13, there will normally be an interface at approximately the level designated I, there being water below this interface and fuel above it. An outlet 178 including a shut-off valve emerges from the sump 106 at a level just above this interface.

Once sufficient water has collected in the sump 106, the float 124 rises and lifts the rod 110. Assuming that the tank 100 is horizontal, the float 124 moves vertically and the gap between the spindle 128 and the hole in the arch of the rod enables the float to remain vertical even though the rod 110 has moved pivotally. The valve closure member 142 is lifted by the rod 110 and the cone 146 lifts away from its seat. Water can thus flow out until the float 124 has descended sufficiently to re-seat the cone 146 in the upper end of the passage 140. Normally the second valve closure member 152 is in a lower position in which its cone 154 is spaced from the tapered lower end of the passage 140, and hence this closure member does not in any way inhibit water outflow.

The separator 106 can be mounted with the rod 110 extending longitudinally of the vehicle or transversely of the vehicle. If the rod 110 extends longitudinally of the vehicle, and one side of the vehicle is higher than the other because the vehicle is travelling along a slope, then the float 124, in attempting to stay in the uppermost position, will rotate the rod 110 about its axis. Engagement between the flats 120 and 122 (as shown in FIG. 13) will limit the amount by which the rod 110 can rotate. Similarly, if the rod 110 is mounted transversely of the vehicle, it will be rotated when the vehicle is moving uphill or downhill.

The construction of FIG. 9 enables the float to remain vertical, and hence at right angles to the always horizontal interface 1, while a vehicle is performing normal travel movements, whether on paved roads, on tracks or off-road.

In the event that the vehicle should turn over and come to rest on its side, leakage of fuel through the valve 134 is prevented as the mass 160 serves in these circumstances to press the member 152 into the passage 140 and seal this passage off.

Should the tank construction of FIG. 9 be inverted, the disc 172 falls onto the seat J74 to close the valve 170 and prevent water and solid particles returning to the tank 100 from the sump 106. The flange 176 prevents solid material which is close to the wall of the sub-chamber 106.1 from falling onto what has become the bottom of the sump, i.e. falling onto the baffle 148. From the baffle 148, as the tank returns to its normal position, the particles could drop into the valve 134. The construction is thus suitable for use on aircraft.

When the valve 134 and/or the filter in the shroud are to be serviced, the clean fuel above the interface 1 can be drained through the outlet 178. Thereafter water and solid material can be drained by removing the plug 166.

In the illustrated embodiments direct mechanical linkages from the floats to the valve closure members have been shown. It will be understood, however, that the valves could be solenoid operated and that the floats could be used to close contacts in the electrical supply circuits of the solenoids of the valves.

If desired, for use in very cold climates, the valve 134 can include heating means, e.g. electrical heating coils or elements to prevent the water in the viscinity of the valve 134 from freezing. Alternatively, the entire sump can be heated.

Sludge formation occurs when diesel fuel and water are in contact for lengthy periods of time e.g. more than 24 hours. In the embodiments of the invention described, the water-diesel interface is small (being over the area of the sump and not over the area of the tank) and water is automatically removed from the sump.

Figure 14:
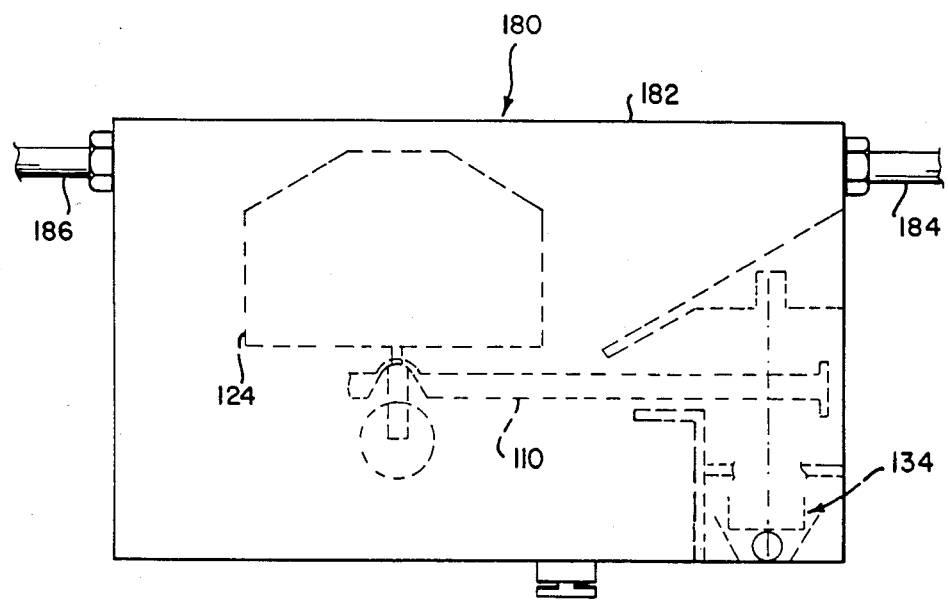
FIG. 14 illustrates a water from fuel separator.

The separator 180 of FIG. 14 is essentially the same as that of FIG. 9 except in that it is intended to be fitted into a fuel line instead of to the bottom of a tank. The spigot 108 and the valve 170 are omitted and the top 182 of the housing of the separator is closed. A fuel inlet line is shown at 184 and a fuel outlet line at 186. Fuel flowing from a storage tank flows into the separator 180 and its velocity drops, thus promoting the separation of water and solid particles from the fuel.

We claim:

1. A fuel tank construction comprising a tank and a sump secured to the underside of the tank, an outlet from the sump, a float in the sump the specific gravity of which is such that it sinks in fuel but floats on any water which has accumulated in the sump, first normally closed valve which controls flow through said outlet and which opens upon the float detecting an increasing water level in the sump, and a second valve for controlling flow through said outlet which second valve is normally open and which is gravitationally biassed to its open position but which moves under gravitational forces to a closed position upon the tank construction being tilted sufficiently or inverted.

2. A fuel tank construction which includes a tank and a sump, there being an opening in a bottom wall of the tank and the sump being secured to the tank and lying beneath said bottom wall, a water discharge outlet leading from said sump through the wall of the sump to externally of said fuel tank construction, a float in said sump, a valve the inlet to which from the sump is below the interface between the fuel and water and which normally closes-off said water discharge outlet, valve operating means which opens said valve upon the float rising with an increasing level of accumulated water in the sump thereby automatically to discharge said accumulated water to the exterior of said fuel tank construction, and a normally open gravity operated valve in said opening for permitting liquid flow downwardly into said sump from the tank but preventing liquid flow from said sump to the tank while the tank construction is inverted.

3. A fuel tank construction which includes a rank and a sump, there being an opening in a bottom wall of the tank and the sump being secured to the tank and lying beneath said bottom wall, a water discharge outlet leading from said sump through the wall of the sump to externally of said fuel tank construction, a float in said sump, a valve the inlet to which from the sump is below the interface between the fuel and water and which normally closes-off said water discharge outlet, valve operating means which opens said valve upon the float rising with a increasing level of accumulated water in the sump thereby automatically to discharge said accumulated water to the exterior of said fuel tank construction, a mechanical linkage between said float and a closure member of the valve, said linkage including a rod and means mounting one end of the rod for pivoting movement about a horizontal axis and rotational movement about a longitudinal axis of the rod, the float being connected to the rod by means which permits limited relative motion between the rod and the float.

4. A fuel tank construction according to claim 3 and including means for limiting rotation of the rod about said longitudinal axis thereof.

5. A fuel tank construction according to claim 3 and which further comprises a fuel filter within the tank, means mounting the fuel filter for movement between a first position in which it is above said opening and a second position in which it is spaced laterally from said opening, and a fuel outlet line which communicates with the fuel storage space of the tank through said filter.

6. A fuel tank construction which includes a tank and a sump, there being an opening in a bottom wall of the tank and the sump being secured to the tank and lying beneath said bottom wall, a water discharge outlet leading from said sump through the wall of the sump to externally of said fuel tank construction, a float in said sump, a valve the inlet to which from the sump is below the interface between the fuel and water and which normally closes-off said water discharge outlet, valve operating means which opens said valve upon the float rising with an increasing level of accumulated water in the sump thereby automatically to discharge said accumulated water to the exterior of said fuel tank construction, a further normally open valve for controlling liquid flow through said outlet, said further valve including a downwardly facing valve seat, and a valve closure member having a seating surface which is normally held spaced downwardly from said valve seat by gravity.

7. A water from fuel separator comprising a housing having a fuel inlet and a fuel outlet, a float in the housing the specific gravity of which is such that it floats on any water in the housing but sinks in fuel, a water discharge outlet leading from the housing through the wall of the housing to externally of the separator, a valve the inlet to which from the housing is below the interface between the fuel and water and which normally closes-off said water discharge outlet, a linkage between a closure member of the valve and the float whereby the float opens the valve when it rises upon water accumulating in the housing, the float being connected to the linkage by a universal joint which enables the float to remain vertical when the housing is tilted and a second valve for controlling flow through said water outlet which second valve is normally open and which is gravitationally biassed to its open position but which moves under gravitationally forces to a closed position upon the tank construction being tilted sufficiently or inverted.

* * * * *